(12) United States Patent
West et al.

(10) Patent No.: US 7,667,432 B2
(45) Date of Patent: Feb. 23, 2010

(54) METHOD FOR INTERCONNECTION OF BATTERY PACKS AND BATTERY ASSEMBLY CONTAINING INTERCONNECTED BATTERY PACKS

(75) Inventors: Dorian West, Menlo Park, CA (US); Eugene Berdichevsky, Palo Alto, CA (US); Scott Kohn, Menlo Park, CA (US)

(73) Assignee: Tesla Motors, Inc., San Carlos, CA (US)

( * ) Notice: Subject to any disclaimer, the term of this patent is extended or adjusted under 35 U.S.C. 154(b) by 252 days.

(21) Appl. No.: 11/414,050

(22) Filed: Apr. 27, 2006

(65) Prior Publication Data
US 2007/0252556 A1 Nov. 1, 2007

(51) Int. Cl.
*H02J 7/00* (2006.01)
(52) U.S. Cl. .......................... 320/112; 320/116; 307/71
(58) Field of Classification Search .............. 320/104, 320/107, 112, 120, 116, 117, 126; 307/10.7, 307/71; 439/500
See application file for complete search history.

(56) References Cited

U.S. PATENT DOCUMENTS

| | | | | |
|---|---|---|---|---|
| 3,165,689 A | * | 1/1965 | Hughes | 320/104 |
| 4,065,710 A | * | 12/1977 | Zytka | 320/103 |
| 4,177,376 A | * | 12/1979 | Horsma et al. | 219/553 |
| 5,185,898 A | * | 2/1993 | Johnson | 15/3 |
| 5,191,275 A | * | 3/1993 | Singhal | 320/112 |
| 5,747,964 A | * | 5/1998 | Turnbull | 320/124 |
| 5,816,847 A | * | 10/1998 | Snyder | 439/500 |
| 5,977,746 A | * | 11/1999 | Hershberger et al. | 320/112 |
| 5,982,050 A | * | 11/1999 | Matsui | 307/10.7 |
| 6,127,798 A | * | 10/2000 | Lansang et al. | 320/104 |
| 6,137,260 A | | 10/2000 | Wung et al. | |
| 6,391,489 B1 | * | 5/2002 | Winch et al. | 429/121 |
| 6,541,151 B2 | * | 4/2003 | Minamiura et al. | 429/98 |
| 6,636,016 B2 | * | 10/2003 | Tanaka et al. | 320/107 |
| 7,183,746 B1 | * | 2/2007 | Carter | 320/116 |
| 7,208,247 B2 | * | 4/2007 | Chan et al. | 429/158 |
| 2002/0022159 A1 | * | 2/2002 | Pierson et al. | 429/1 |
| 2003/0227275 A1 | * | 12/2003 | Kishi et al. | 320/107 |
| 2004/0049243 A1 | * | 3/2004 | Seligman | 607/57 |
| 2004/0160209 A1 | * | 8/2004 | Emori et al. | 320/104 |
| 2004/0169489 A1 | * | 9/2004 | Hobbs | 320/104 |
| 2004/0191542 A1 | * | 9/2004 | McLeod et al. | 428/461 |
| 2004/0241540 A1 | * | 12/2004 | Tsutsumi et al. | 429/122 |
| 2004/0258982 A1 | * | 12/2004 | Coffey et al. | 429/94 |
| 2005/0151509 A1 | * | 7/2005 | Cook | 320/116 |
| 2005/0170245 A1 | | 8/2005 | Vartak et al. | |
| 2006/0071630 A1 | * | 4/2006 | Dame et al. | 320/104 |
| 2006/0091855 A1 | * | 5/2006 | Seo | 320/116 |
| 2006/0246350 A1 | * | 11/2006 | Takayama et al. | 429/178 |
| 2007/0188147 A1 | * | 8/2007 | Straubel et al. | 320/134 |
| 2007/0194755 A1 | * | 8/2007 | Makhija et al. | 320/116 |

OTHER PUBLICATIONS

International Search Report, Aug. 11, 2008, 2 pages.
Written Opinion of the International Searching Authority, Aug. 11, 2008, 4 pages.

\* cited by examiner

*Primary Examiner*—Patrick J Assouad
*Assistant Examiner*—Arun Williams
(74) *Attorney, Agent, or Firm*—Innovation Partners; Charles E. Gotlieb

(57) ABSTRACT

A system and method interconnects battery packs using a flexible bus bar to prevent vibration from breaking or damaging the connections therebetween.

22 Claims, 4 Drawing Sheets

METHOD FOR INTERCONNECTION OF BATTERY PACKS AND BATTERY ASSEMBLY CONTAINING INTERCONNECTED BATTERY PACKS

RELATED APPLICATIONS

The subject matter of this application is related to the subject matter of application Ser. No. 11/129,118 entitled, "Method and Apparatus for Mounting, Cooling, Connecting and Protecting Batteries" filed on May 12, 2005 by Jeffrey B. Straubel, Eugene Berdichevsky, David Lyons, Thomas Colson, Martin Eberhard, Ian Wright and Robert Ferber, application Ser. No. 11/353,648 entitled, "System and Method for Fusibly Linking Batteries" filed on Feb. 13, 2006 having the same inventors and assignee as this application and is hereby incorporated herein by reference in its entirety.

FIELD OF THE INVENTION

The present invention is related to battery systems and more specifically to interconnections among battery assemblies.

BACKGROUND OF THE INVENTION

As described in the related application, conventional rechargeable batteries may be arranged as small sets of batteries coupled to one or more conductors at either end of the sets of batteries, thereby coupling each set of batteries in parallel. The small sets of batteries may be coupled to one another in series to generate higher voltages than the voltages of the batteries themselves. The series-coupled sets of batteries may be provided in a single pack for ease of handling. However, it may be desirable to couple two or more of these packs to one another in series to generate higher voltages or in parallel to generate higher currents, or a combination of series and parallel couplings to achieve both a higher current and a higher voltage.

This inter-pack, series or parallel coupling can present various problems. For example, the related application described a geometry in which an odd number of smaller sets of parallel-connected batteries were arranged to allow connection via a u-shaped connector screwed into adjacent packs. However, this arrangement required the use of screws and bolts interior to the packs: The use of screws and bolts interior to the pack required extreme care to prevent dropping the screw or bolt into the pack, potentially shorting the batteries to one another. The screws could have been placed outside the packs to avoid the problems of dropping screws, however, access between the housings to get to the screws would have required space to be wasted.

Conventional wires or solid metal connectors may be used as conductors, as long as the wires or connectors have sufficient current carrying capacity. In a high-current environment, the wires or metal connectors must have sufficient thickness to carry the current required. However, with this thickness comes stiffness. In a high vibration environment, such as an electric or hybrid vehicle like a car or rocket, the wires or thick pieces of metal coupled to battery packs that are moving relative to one another as the vehicle flexes, could cause stresses on the metal conductors, the packs or the terminals connecting the packs to the wires or metal conductors. The stress could cause cracks in the conductors or the packs or cause a loosening at the terminals, and any or all of these things could lead to premature failure of the entire assembly, sparks, or changes to the electrical characteristics.

It can be desirable for any solution to have several properties. First, it can be desirable to keep connectors as short as possible. Short connectors keep the impedance of the connectors low, reducing losses and minimizing the electrical reaction of the connectors as changes occur in power supplied by the batteries. One potential solution towards keeping the conductors short is to use two sets of battery packs that "mirror" one another, allowing conductors to be placed back to back, for example, to reduce the length of the connectors that run between them. However, using different battery packs can increase the complexity of manufacturing and maintenance, as twice as many parts must be stocked and maintained as spares. Additionally, having mirror image battery packs may allow the wrong pack to be at least partially installed, requiring removal of the wrong pack and installation of the proper pack.

What is needed is a system and method that can allow for interconnections of battery packs, for example, with each pack containing multiple sets of parallel connected batteries, and each set connected in series, without placing screws or bolts interior to the packs, and without requiring space between each of the packs, and that can carry large amounts of currents in a high vibration environment, without damaging the packs or the interconnections, and without inducing stresses that would loosen the connections between the interconnecting conductors and the packs, cause sparks or change the electrical characteristics, without requiring lengthy interconnections, and without requiring mirror image battery packs.

SUMMARY OF INVENTION

A system and method folds the terminals of the battery packs from one face over another face of the packs. Two holes in the terminals are used to electrically connect a conventional flexible bus bar to one of the terminal conductors in each of up to two adjacent packs, thereby connecting the packs in series or parallel, without requiring screws or bolts interior to the pack that can fall into the packs, and without requiring space between the packs. The lack of the possibility that screws or bolts-can fall into the packs means less care can be used, reducing manufacturing costs of interconnecting the packs. Because the flexible bus bar will carry large amounts of current but can physically flex, it will not induce stresses in a high vibration environment that can cause a failure of the assembly, sparking or changes to the electrical characteristics of the pack. The battery packs themselves can use an arrangement of the series-connected sets of batteries that allows the bus bars to be short, yet avoids the use of mirror-image or other types of different battery packs.

DETAILED DESCRIPTION OF A PREFERRED EMBODIMENT

Figure 1:
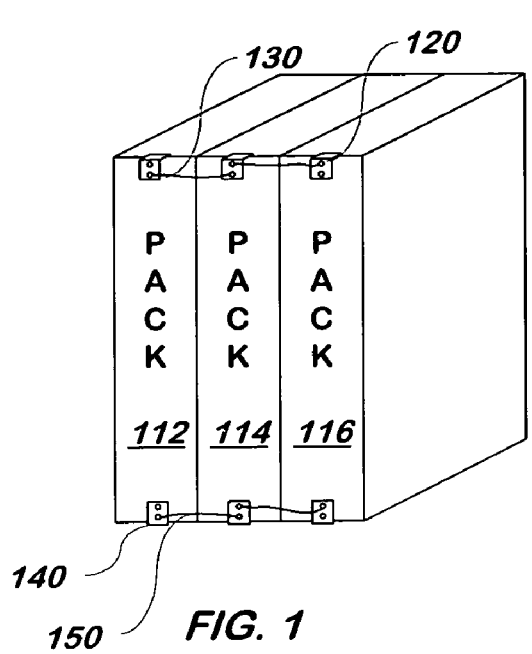
FIG. 1 is a block schematic diagram of a system of parallel-interconnected battery packs according to one embodiment of the present invention.
Figure 3:
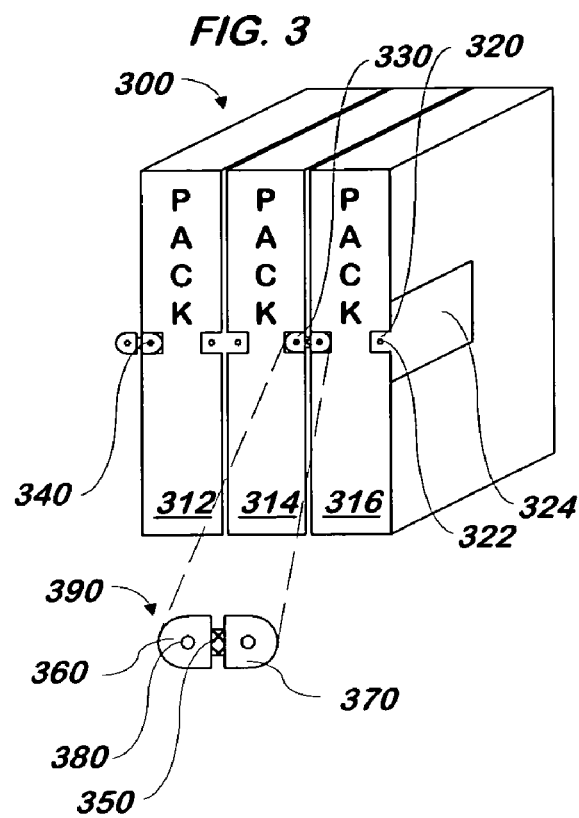
FIG. 3 is a block-schematic diagram of a system of series-interconnected battery packs according to another embodiment of the present invention.
Figure 5:
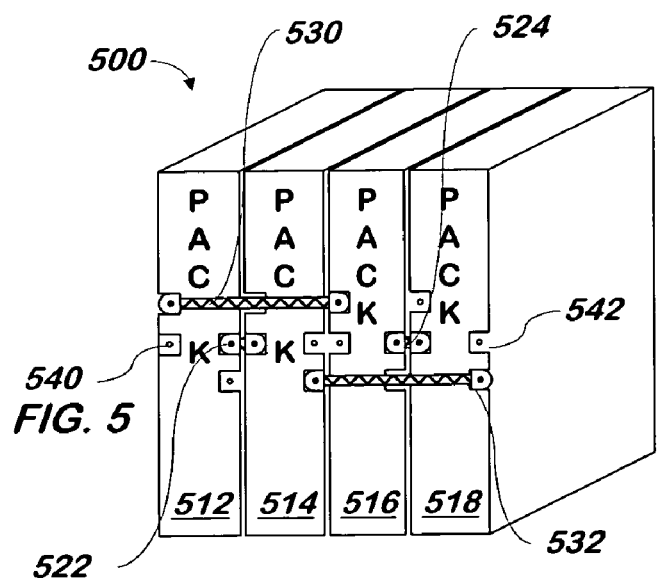
FIG. 5 is a block-schematic diagram of a system of series- and parallel-interconnected battery packs according to another embodiment of the present invention.

FIG. 1 is a block schematic diagram of a system of interconnected battery packs according to one embodiment of the present invention. FIG. 1 shows parallel interconnected battery packs, but battery packs may be connected in series as is shown in FIG. 3, and battery packs may be connected in series and parallel as is shown in FIG. 5.

Referring now to FIG. 1, battery pack 112 is electrically coupled via flexible bus bars 130, 150 to battery pack 114. Battery pack 114 is similarly coupled electrically to battery pack 116. In one embodiment, each pack 112, 114, 116 is adjacent or nearly adjacent to each of the other packs 112, 114, 116. In one embodiment, each battery pack 112, 114, 116 consists of a set of battery bricks connected in series as described below. Each battery brick is a set of batteries connected in parallel to one another, as described below. The battery bricks are not separately shown in the Figure, but are shown in the related application as sets of parallel-connected batteries.

Battery pack 112 is selected as a representative pack, but packs 114 and 116 are constructed in the same manner. Each terminal 130, 140 of battery pack 112 is a metal connector on the outside edge of battery pack 112. Each terminal 130, 140 is connected to one of the terminals of the brick at the edge of the set of bricks. Each terminal 130, 140 extends from a side of the pack 112, such as the top or bottom, and then folds over to a plane parallel to another side of the pack. The first side may be open so that the batteries are exposed to view, access or both, and the other side may be sealed so that the batteries are not exposed to view or access. The open side permits the terminal 130, 140 to extend from the pack 112 without interference and the second side prevents screws intended for the terminal 130, 140 from falling into the pack 112.

A flexible bus bar 150 connects external terminal 140 of battery pack 112 to an external terminal of battery pack 114. In one embodiment, flexible bus bar 150 is a conventional mesh-like, flexible ribbon or tube of multiple, thin wire strands which allows a very high current carrying capacity while reducing the danger of stresses and fractures to the assembly. In one embodiment, flexible bus bar 150 is a conventional flexible bus bar, such as may be fabricated using conventional ground braids, such as the conventional FTCB 15-35 ground braid with a crimped-on lug commercially available from Erico, of Solon, Ohio (at the website of Erico.com). The extreme flexibility of flexible bus bar 150 relative to ordinary electric facilities that can carry a similar current as that which -can be carried by the flexible bus bar 150 is advantageous in a high vibration environment, such as the engine of a car, because the wiring will not break or fracture itself, or the components to which it is connected, as those components vibrate or move relative to one another. A non-flexible method of wiring, particularly a non-flexible method of wiring that is expected to carry a high level of current like a solid conductor, could fracture or break, or induce fractures or breaks in the packs 112, 114, 116.

Battery pack 114 and battery pack 116 are coupled to one another in a similar manner, and any number of additional battery packs may be coupled to one another in this manner. FIG. 1 illustrates battery packs coupled in parallel; however, as shown in more detail in FIG. 3, battery packs may also be coupled in series using the flexible bus bar arrangement described herein. Other arrangements could couple some battery packs in series and others in parallel, according to the voltage and current needs of the device or devices that use the current and voltage supplied by the battery packs 112, 114, 116.

Another Embodiment: Connecting Battery Packs In Series

Referring now to FIG. 3, a set 300 of interconnected battery packs 312, 314, 316 is shown according to another embodiment of the present invention, and a flexible bus bar 390 is shown in more detail. Battery packs 312, 314, 316 are similar to battery packs 112-116 shown in FIG. 1. As described in the related application Ser. No. 11/129,118, the series connections of each brick in a battery pack such as battery pack 316 is made via a solid conductor spanning two bricks. Each brick has a set of batteries oriented in the same polarity, but opposite to that of the electrically adjacent brick. Thus, the batteries in each brick are oriented upside down relative to the batteries in the adjacent bricks. A single solid conductor not only connects one of the polarity terminals one set of batteries in one brick to one another in parallel, but many of them extend to also connect the opposite polarity terminals of another set of batteries in an adjacent brick to one another in parallel. The effect of using this single conductor is to connect the two sets of batteries in series to one another. For example, a conductor can be in electrical contact with the positive terminals of the batteries in brick 1, as well as the negative terminals of the batteries in brick 2, connecting brick 2 in series with brick 1. There may be any number of series-connected bricks in a battery pack, though, as mentioned above, in one embodiment, the number of bricks is nine. Each brick in a given battery pack is therefore adjacent to any other brick to which it is directly connected in series in this manner.

The conductors at either end of the series of bricks contact just the conductors of one brick. So, using the example above, if brick 1 is the end of the series of bricks, the negative terminals of the batteries of brick 1 may be electrically connected via a conductor, which is coupled to the edge terminal of the battery pack. For example, conductor 324, shown in the Figure, may be the negative terminal for the battery pack. (The remaining conductors are not shown to avoid cluttering FIG. 3, but are shown in more detail in FIGS. 4A and 4B.) In one embodiment, the conductor 324 is electrically connected to, or forms, a terminal 320, which is used as the negative terminal for the battery pack 316. In one embodiment, terminal 320 is actually a part of conductor 324, formed by bending a tab extending from conductor 324 at a 90 degree angle, although other embodiments may have an electrical connection such as a weld. Each of the battery packs 312-314 may use a similar construction as that described above for battery pack 316.

In one embodiment, the flow of current through the battery bricks, looking at the narrow side, would be seen as back and forth through adjacent sets of parallel-connected battery bricks. However, when viewed from the flat face of the pack 312-316, the flow of current is circular, starting at one terminal, such as terminal 322 and ending up at approximately the same position (though on the opposite face as the current started). This enables the two terminals on the battery pack to be located at the same height as one another, allowing for short series connections between adjacent battery packs 312-316. This is achieved via placement and shape of the conductors within each pack, as will now be described.

Figure 4A:
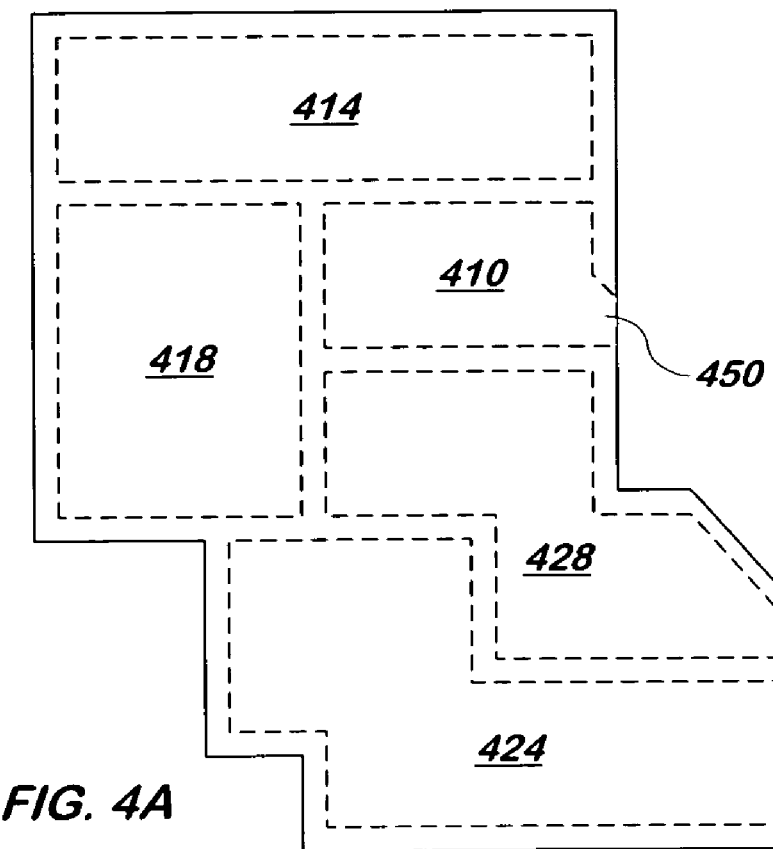
FIGS. 4A and 4B are a diagram of the conductors of each of the two sides of a battery pack according to one embodiment of the present invention.
Figure 4B:
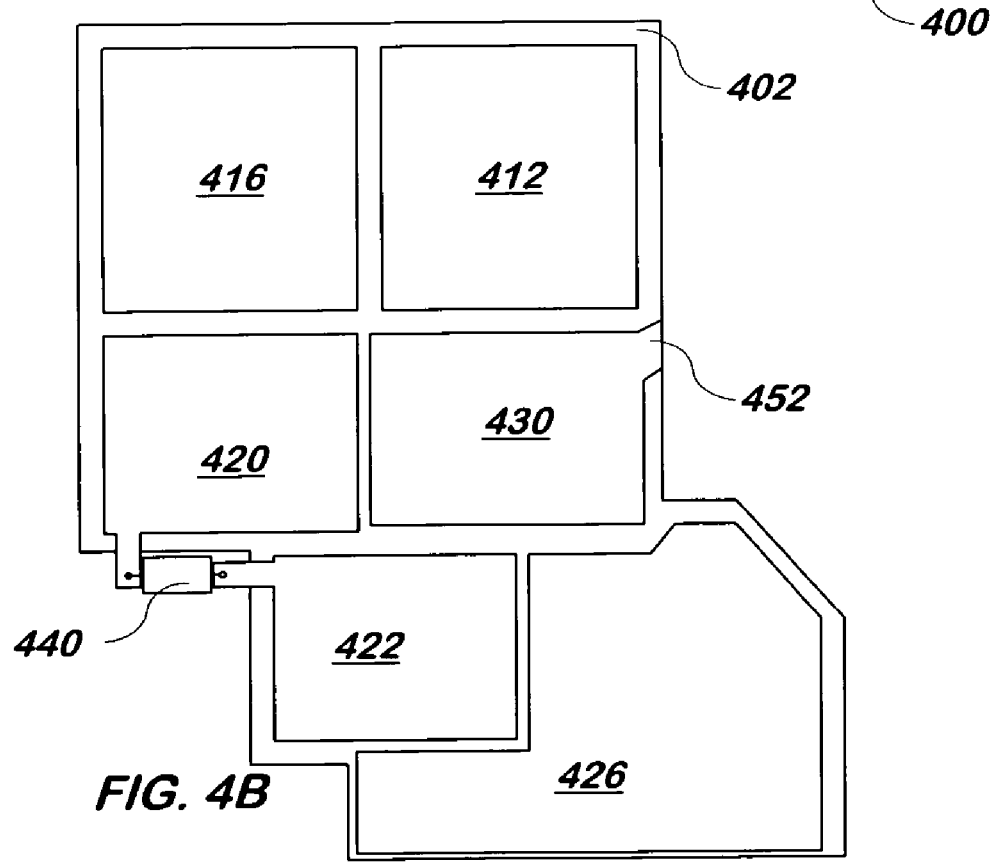

Referring now to FIGS. 4A and 4B, an arrangement of the conductors on either side of a battery pack are shown according to one embodiment of the present invention. Conductors 410, 414, 418, 424 and 428 are on the far side of substrate 400 and conductors 412, 416, 420, 422, 426 and 430 are on the near side of substrate 402. When substrate 402 is placed behind substrate 400 and sets of batteries are placed between them, the conductors and batteries form an electrical connection from edge 450 to edge 452 or vice versa. For example, the positive terminals of a set of batteries are electrically connected to conductor 410, such as may be described in the related application. The positive polarity terminals of that same set of batteries are electrically coupled to the lower half of conductor 412. Negative terminals of another set of batteries are electrically coupled to the upper half of conductor 412, and the positive terminals of that other set of batteries are electrically coupled to the right half of conductor 414. Thus, the two sets of batteries are coupled in series to one another. Multiple sets of batteries are coupled in this manner via the conductors 410-430, with current flowing in numerical order of the conductors, or in reverse order, with the resulting flow being circular when viewed from the flat face of the pack. However, conductors 420 and 422 operate as a single conductor, with fuse 440 electrically coupled between them to electrically protect the batteries as described in the related application. In one embodiment, a bus bar similar or identical to that described herein is used in place of fuse 440 in the event that fusing is not desired or required.

End 450 of edge conductor 410 and end 452 of edge conductor 410 is folded 90 degrees to form a terminal, in a manner similar to that shown for terminal 320 of edge conductor 324 of FIG. 3. Referring again to FIG. 3, the terminal of one pack 312, 314, 316 is electrically connected to the nearest terminal of another pack 312, 314, 316 using a flexible bus bar 390, for example, as shown between packs 314-316. No flexible bus bar is shown between packs 312 and 314, but one could be installed there if a series connection between the two packs 312, 314 was desired. Any number of packs may be connected using any manner described herein.

In one embodiment, the flexible bus bar 390 is made of a conventional braided conductive metal 350, such as copper or aluminum, onto which conductive terminals 360, 370 may be crimped or otherwise electrically connected. Each terminal may have a hole, such as hole 380, to accept a screw, which is inserted through hole 380, and threaded into a hole 322 in terminal 320 of any battery pack. The hole 322 may be threaded or self tapping screws may be used. When the screw, thus inserted and threaded, is tightened, it physically and electrically connects the terminal 320 to the bus bar 390. The head 340 from such a screw is shown in the Figure with the screw head 340 parallel to the face of the pack 312, the terminal of which the screw is threaded into.

A similar connection is made to the opposite polarity terminal of the adjacent battery pack using the other terminal of the same bus bar.

Another Embodiment: Parallel and Series Connections.

Figure 4C:
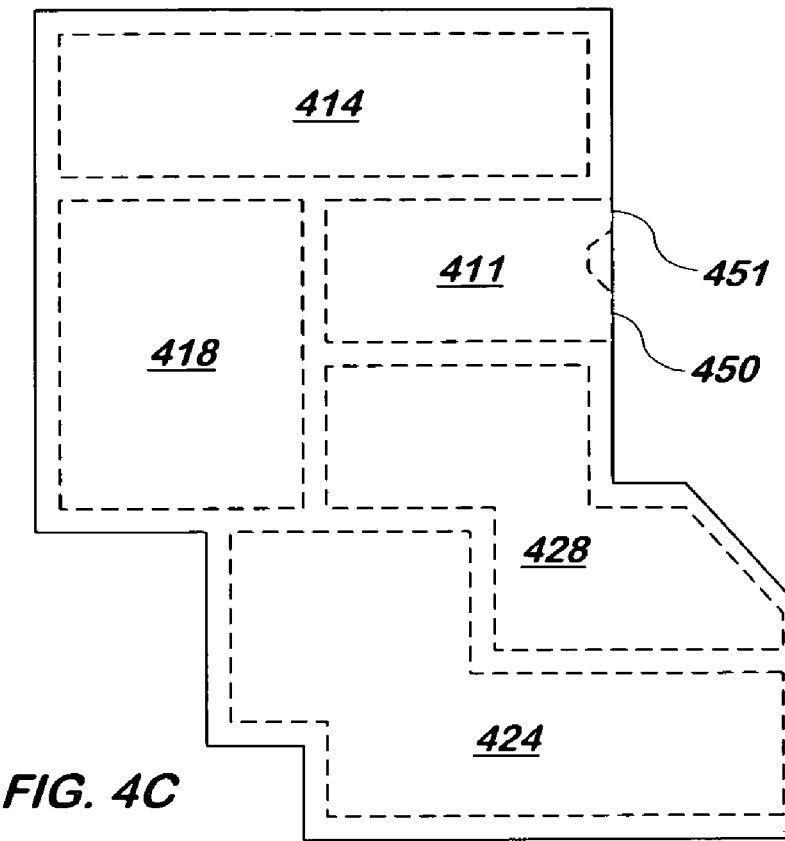
FIGS. 4C and 4D are a diagram of the conductors of each of the two sides of a battery pack according to another embodiment of the present invention.
Figure 4D:
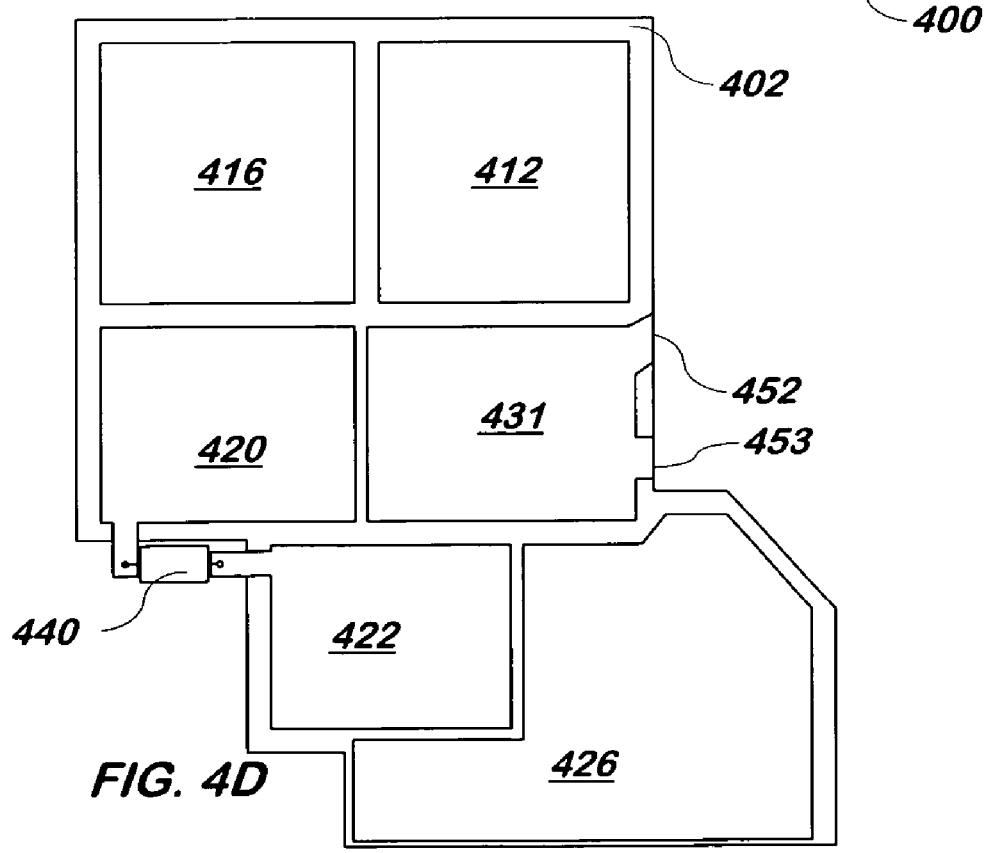

In one embodiment of the present invention, the terminal conductors are shaped to allow series connections, parallel connections or both. Referring now to FIGS. 4C and 4D, the conductors are the same as described above with reference to FIGS. 4A and 4B, respectively, but the terminal conductors 410 and 430 of FIGS. 4A and 4B have been replaced with conductors 411 and 431 of FIGS. 4C and 4D. Conductor 411 has terminal 451 that is folded over the face of the battery pack (or is coupled to a terminal on that face) and conductor 431 has terminal 453 that is folded over the face of the battery pack or is coupled to a terminal on that face. In all other respects, the position of the conductors and flow of current is the same.

Referring now to FIG. 5, a battery assembly 500 containing four battery packs 512-518 is shown. Each battery pack 512-518 is similar to that of battery packs 312-316, except that they use the conductors shown in FIGS. 4C and 4D to connect the batteries in each set to one another in parallel and to connect adjacent sets of batteries to one another in series. This is in contrast to the battery packs of FIG. 3, which employ the conductors of FIGS. 4A and 4B. Packs 512 and 514 are coupled to one another in series via flexible bus bar 522 and packs 516 and 518 are coupled to each other in series via flexible bus bar 524. Each pair of series-coupled packs 512, 514 being one pair and 516, 518 being another, are coupled in parallel via flexible bus bars 530, 532.

Each of the terminals used for the series connections are at or near the same height relative to the bottom edge of the battery packs 512-518. Each of the terminals used for the parallel connections of one polarity are at the same height relative to the bottom edge of the battery packs 512-518. The terminals used for the series connections are at a height relative to the bottom edge of the battery packs 512-518 that is different from the height, relative to the bottom edge of the battery packs, of each terminal used for the parallel connections, and each polarity of the terminals used for the parallel connections are at a different height, relative to the bottom edge of the battery packs 512-518 from one another. This arrangement ensures that the flexible bus bars remain as short as possible and do not cross one another.

Insulators (not shown) may be placed over the terminals that flexible bus bars 530 and 532 cross, to avoid a connection between the bus bars and those terminals. In another embodiment, flexible bus bars are insulated. In still another embodiment, the unused terminals are scored just behind the bend, to allow them to be snapped off and removed, so that connection to the bus bar is not possible.

This manner of extending terminals from the battery packs allows for complete flexibility of connection. The two edge terminals 540, 542 may be used as terminals for the assembly.

Method

Figure 2:
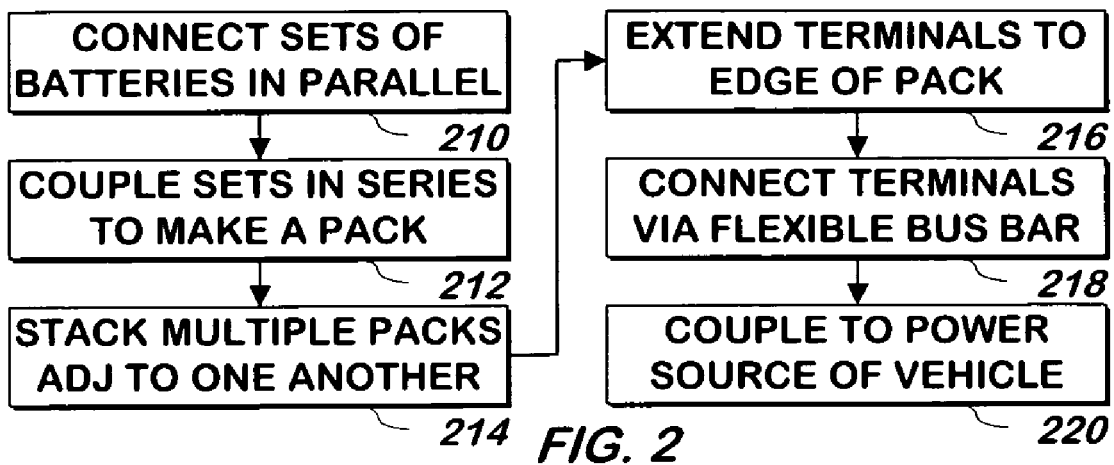
FIG. 2 is a flowchart illustrating a method of connecting battery packs according to one embodiment of the present invention.

FIG. 2 is a flowchart illustrating a method of connecting battery packs according to one embodiment of the present invention.

Connect Sets of Batteries in Parallel

Referring now to FIG. 2, a set or sets of batteries are connected in parallel 210 to form battery bricks. To connect the set(s) of batteries in parallel, the method described above, and in the related applications, may be used.

Couple Sets in Series to Make a Pack

In one embodiment, as described above, battery bricks (e.g. nine battery bricks) are coupled in series to form battery packs 212. In one embodiment, step 212 includes connecting the battery bricks in such a manner that the terminals will appear at opposite sides of the battery packs as described above. In one such embodiment, current flows back and forth between the opposite sides of the battery pack, and relative to the sides of the pack, flows in a circle around the periphery of the pack as described above. At each end of the series connection, two terminals will exist, one of each polarity.

Extend Terminals to Edge of Pack

Packs are stacked adjacent, or nearly adjacent, to one another 214 that will not be between the stacked packs. Battery terminals are extended to the edge of each battery pack 216. To extend the terminals to the edge of the pack, conductive materials, such as metal plates, are positioned on an outside edge of the battery pack and connected to, or formed into, each of two terminals at the end of the series connection described above to extend the flow of current to the exterior of the battery pack. In one embodiment, the two terminals extend from the top and bottom of the pack, and in another embodiment, the two terminals extend from either side of the pack, and in still another embodiment, there are four terminals as described above: one for series connection and another for parallel connection and each of the terminals for a pack fold over the same side of the pack, to save space and eliminate the possibility that screws will fall into the pack, as described above.

Connect Terminals Via Flexible Bus Bar

A terminal from one battery pack is connected to one a terminal from at least one other battery pack using a flexible bus bar 218. To connect the external terminals with a flexible bus bar, each end of the flexible flex bar is physically and electrically connected to the terminals on adjacent battery packs. For example, a screw may be inserted through a terminal connector of the flexible bus bar to a threaded hole on a terminal of the battery pack to connect each end of the flexible bus bar to a terminal of a different battery pack. The multiple, thin wire strands of the flexible bus bar allow a high current carrying capacity with a minimal danger of stresses and fractures in the flexible bus bar or battery pack in a high vibration environment, as described above. In one embodiment, the battery packs may be coupled in parallel as illustrated in FIG. 1, or in another embodiment, the battery packs may be coupled in series as illustrated in FIG. 3, in each case via one or more flexible bus bars. In another embodiment, a combination of series and parallel couplings are used. In one embodiment, the current carried by the flexible bus bar is in excess of 30, 50, 100, 150, 200, 250, 300 or 500 amps.

The batteries thus connected may be coupled to the power source of an electric or hybrid vehicle, such as an electric motor of an automobile or rocket 220.

Figure 6:
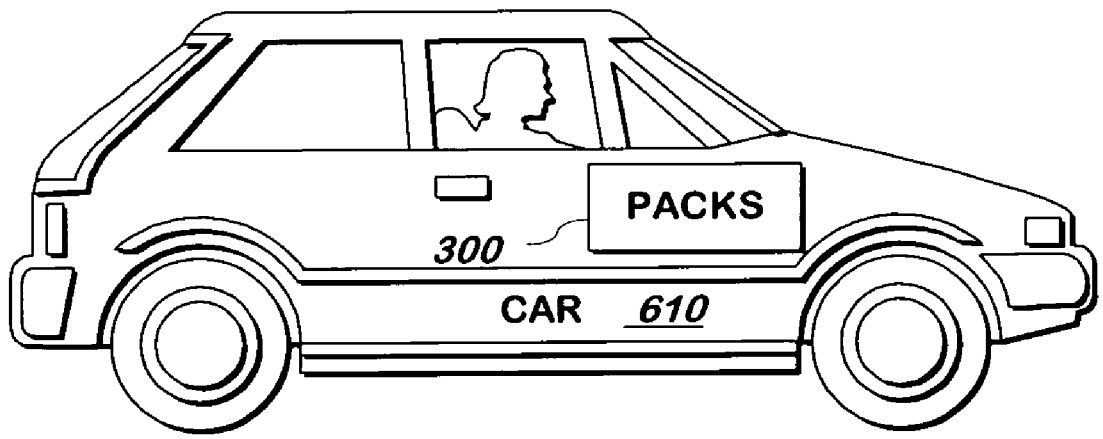
FIG. 6 is a block schematic diagram of a vehicle containing the set of interconnected battery packs of FIG. 1, 3, 5, or any of these according to one embodiment of the present invention.

The method of FIG. 2 may be use to build the battery assembly consisting of two or more battery packs and one or more interconnecting bus bars, and such a battery assembly may be used to build an other products. Such products may include some or all of the power storage and supply of a battery- or hybrid-powered automobiles, rockets or other vehicles 610 of FIG. 6. The steps of FIG. 2 are used to construct the battery assembly, such as those described with respect to FIG. 1, 3 or 5, either in the vehicle, or separately so that it may be added to the vehicle. The remainder of the vehicle may be constructed using conventional techniques.

What is claimed is:

1. A method of electrically coupling a plurality of battery packs to one another, comprising:
   coupling a plurality of sets of batteries in series, each set comprising a plurality of batteries coupled in parallel, to produce each of the plurality of battery packs;
   providing at least two terminals at least near one face of each of the plurality of battery packs; and
   electrically coupling to one another each of the plurality of battery packs by electrically coupling each of at least one of the terminals of each of the battery packs to at least one of the terminals of at least one other of the battery packs, at least one of the couplings being made via at least one flexible mesh conductor capable of carrying a current in excess of 30 amps.

2. The method of claim 1, wherein:
   the at least two terminals of each of the plurality of battery packs extend from at least near a different face of said pack to a location substantially adjacent to the face of said pack; and
   the conductors are connected to the flexible bus bar via a screw terminal in which the head of the screw is parallel to the face of the pack.

3. The method of claim 1, wherein the flexible conductor comprises a metal mesh.

4. The method of claim 3, wherein the flexible mesh conductor comprises a flexible bus bar comprising at least two terminals.

5. The method of claim 1, additionally comprising locating each of the packs in the plurality substantially adjacent to one another.

6. The method of claim 1, wherein at least two of the at least two terminals are located at a substantially same height relative to an edge of the battery pack.

7. The method of claim 1, wherein for a first battery pack of the plurality of battery packs:
   the at least two terminals comprises at least three terminals;
   a first at least one of the three terminals couples the first battery pack in series to a second battery pack of the plurality of battery packs; and
   a second and third terminal of the at least three terminals couples the first battery pack in parallel to a third battery pack of the plurality of battery packs.

8. The method of claim 1, additionally comprising the step of coupling the plurality of battery packs to a vehicle.

9. The method of claim 8, wherein the vehicle comprises an automobile.

10. The method of claim 8 comprising an electric power source.

11. The method of claim 8 comprising a hybrid-electric power source.

12. A battery assembly comprising:
    a plurality of battery packs each comprising a plurality of sets of batteries coupled in series, each set comprising a plurality of batteries coupled in parallel, each battery pack additionally comprising at least two terminals at least near one face of each said battery pack; and at least one flexible mesh conductor capable of carrying a current in excess of 30 amps, each flexible mesh conductor electrically coupling at least one of the terminals of at least one of the plurality of battery packs to at least one of the terminals of at least one other of the plurality of battery packs.

13. The battery assembly of claim 12 wherein each of the battery packs comprise a plurality of terminals, the terminals extending from one side of said battery pack and adjacent to another side of said battery pack.

14. The battery assembly of claim 12, wherein each battery pack comprises a plurality of sets of batteries, each of the batteries in a set being coupled to one another in parallel, each of the sets being coupled in series.

15. The battery assembly of claim 12, wherein the battery assembly is coupled to a power source of an electric vehicle.

16. The battery assembly of claim 12, wherein the battery assembly is coupled to a power source of a hybrid-electric vehicle.

17. The battery assembly of claim 15, wherein the vehicle comprises an automobile.

18. The battery assembly of claim 15, where in the vehicle comprises a rocket.

19. The battery assembly of claim 16, wherein the vehicle comprises an automobile.

20. The battery assembly of claim 16, where in the vehicle comprises a rocket.

21. The battery assembly of claim 12, wherein the electrical connection is made via two terminals at substantially the same height relative to an edge of each of the at least two battery packs.

22. The battery assembly of claim 12, wherein:
the electrical interconnection is made between a first battery pack, a second battery pack, and a third battery pack;
the electrical interconnection comprises a series connection between the first battery pack and the second battery pack;
the electrical interconnection comprises a parallel connection between the second battery pack and the third battery pack; and
said electrical connections are made via at least three flexible metal meshes.

* * * * *